E. W. BULLOCK AND G. H. BRYAN.
GEAR CUTTING MACHINE.
APPLICATION FILED JUNE 7, 1917.

1,385,200.

Patented July 19, 1921.
7 SHEETS—SHEET 1.

WITNESSES:
George D. Powell
Agnes Nesbitt Powell

INVENTORS
Edward W. Bullock
George H. Bryan
BY
Their ATTORNEYS

E. W. BULLOCK AND G. H. BRYAN.
GEAR CUTTING MACHINE.
APPLICATION FILED JUNE 7, 1917.

1,385,200.

Patented July 19, 1921.
7 SHEETS—SHEET 2.

E. W. BULLOCK AND G. H. BRYAN.
GEAR CUTTING MACHINE.
APPLICATION FILED JUNE 7, 1917.

1,385,200.

Patented July 19, 1921.
7 SHEETS—SHEET 4.

WITNESSES:
George D. Powell
Agnes Herbert Bissell

INVENTORS
Edward W. Bullock
George H. Bryan
BY
their ATTORNEYS

E. W. BULLOCK AND G. H. BRYAN.
GEAR CUTTING MACHINE.
APPLICATION FILED JUNE 7, 1917.

1,385,200.

Patented July 19, 1921.

WITNESSES:
George D. Powell
Agnes Herbert Bissell

INVENTORS
Edward W. Bullock
George H. Bryan
BY
their ATTORNEYS

E. W. BULLOCK AND G. H. BRYAN.
GEAR CUTTING MACHINE.
APPLICATION FILED JUNE 7, 1917.

1,385,200.

Patented July 19, 1921.
7 SHEETS—SHEET 7.

WITNESSES:
George L Powell
Agnes Nesbitt Bissell

INVENTORS
Edward W. Bullock
George H. Bryan
BY
their ATTORNEYS

UNITED STATES PATENT OFFICE.

EDWARD W. BULLOCK AND GEORGE H. BRYAN, OF ROCHESTER, NEW YORK, ASSIGNORS TO GLEASON WORKS, OF ROCHESTER, NEW YORK, A CORPORATION OF NEW YORK.

GEAR-CUTTING MACHINE.

1,385,200.   Specification of Letters Patent.   Patented July 19, 1921.

Application filed June 7, 1917. Serial No. 173,313.

*To all whom it may concern:*

Be it known that we, EDWARD W. BULLOCK and GEORGE H. BRYAN, citizens of the United States, both of Rochester, in the county of Monroe and State of New York, have invented certain new and useful Improvements in Gear-Cutting Machines; and we do hereby declare the following to be a full, clear, and exact description of the same, reference being had to the accompanying drawings, forming a part of this specification, and to the reference characters marked thereon.

The present invention involves several improvements pertaining to gear cutting machinery and has to do particularly with the production of bevel pinions having teeth of generated cross section and also curved in the direction of their length. In a more particular aspect it is contemplated by the present structure to afford a simplified mechanism having comparatively few parts, and a maximum capacity for production. A further and important purpose of the improvement resides in the provision of novel generating and indexing mechanism affording an entirely automatic machine. To these and other ends the invention consists in certain improvements and combinations of parts all as will hereinafter more fully described, the novel features being pointed out in the claims at the end of the specification.

In the drawings.

Similar reference characters indicate the same parts throughout the several views.

The invention is illustrated as applied to a machine employing a rotary face milling cutter, and of the general type in which the cutter and gear blank are moved out of cutting relation with each other at the completion of one tooth space permitting the blank to be indexed to the next tooth space after which the blank and cutter are again brought into operative relationship. The features of the invention are not necessarily to be confined to this particular form of apparatus which is illustrated merely to exemplify a practicable embodiment. For a brief understanding of the construction generally, it may be said that the rotary cutter head is carried by a continuously driven internal gear which is journaled in and adjustable on a supporting frame. The supporting frame is subjected to an oscillatory motion, imparting a generating movement to the rotary cutter head. The rotary cutter head and cutter spindle are periodically moved lengthwise of the spindle axis, to bring the cutter into and out of operative engagement with the gear blank, which is automatically indexed during the time that the cutter is withdrawn. The indexing takes place through the agency of a stationary member or stop mounted on the frame in the path of the index mechanism, which is carried by a generating sleeve, and normally locked in engagement with the blank spindle, the latter being turned independently of the generating sleeve through the space of one tooth when the parts are disengaged.

Figure 1:
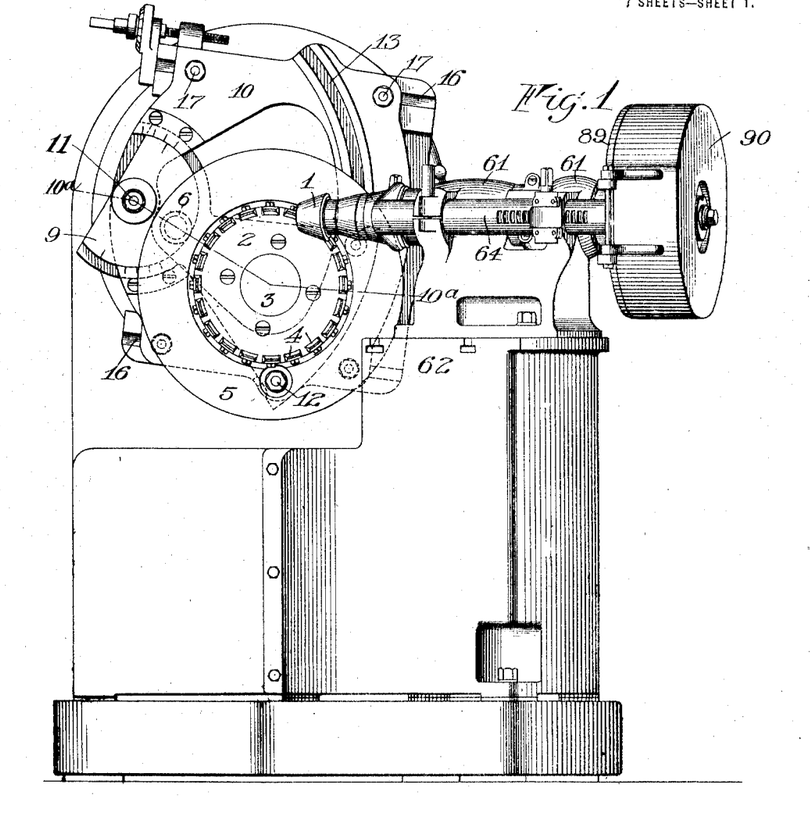
Figure 1 is a side elevation showing a gear cutter equipped with the novel features of the invention, and arranged for cutting a pinion which is in position.
Figure 10:
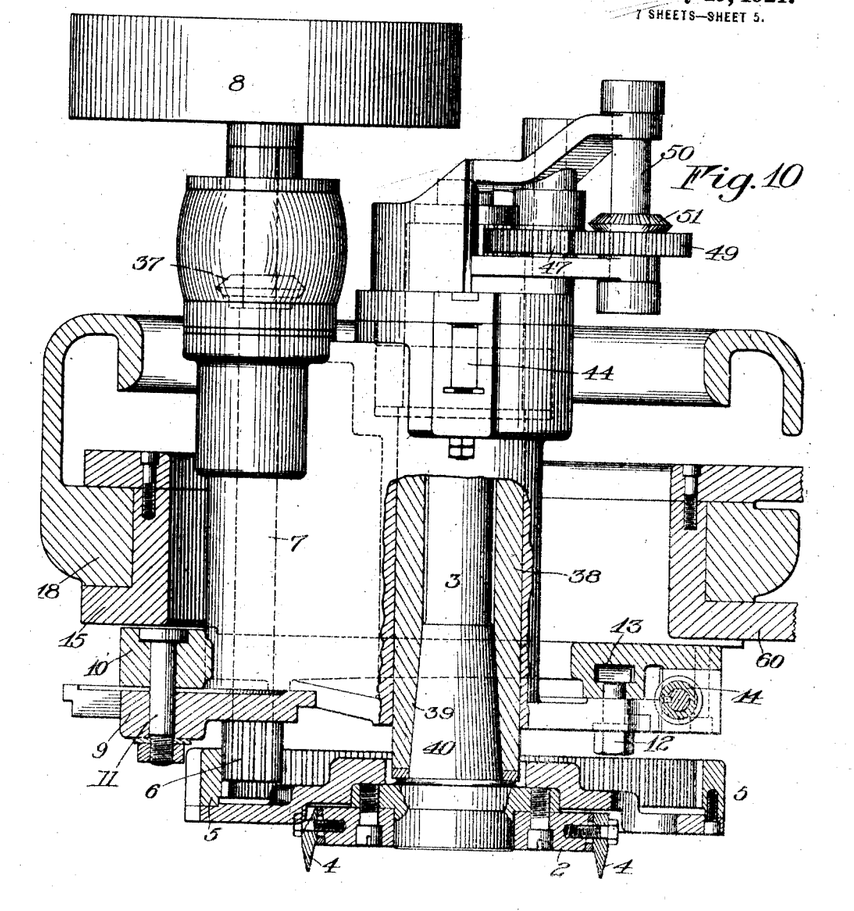
Fig. 10 is a horizontal sectional view on line $10^a$—$10^a$ of Fig. 1.

With this brief description, the structure will be more clearly understood from consideration of the mechanism in which (referring to Figs. 1, 2 and 10), 1 designates the gear blank which is illustrated in the form of a pinion, and 2 is the cutter head mounted on the cutter spindle 3 and provided with a plurality of individual tools or cutters 4 arranged in a circular path about the center of the cutter head so as to travel through the gear blank in a circular path. The cutter head 2 is fixed to the internal gear 5 which is driven by a pinion 6, the latter being carried by a spindle 7 having fixed to its outer end a driving pulley 8. The spindle 7 is arranged in suitable bearings in a holder 9 which is adjustably attached upon the plate 10. The holder 9 is pivoted upon the plate 10 so as to be adjustable upon the axis of a bolt 11 therein and is held in adjusted position by suitable bolts 12 which engage the guideway 13 of the plate 10 as shown in Figs. 1 and 10. Adjustment of the holder is obtained by loosening the bolts 12 and turning the worm 14, which latter is carried by the plate 10 and coöperates with a threaded portion upon the holder 9. The plate 10 is laterally adjustable upon a supporting frame 15 by means of guideways 16 and coöperating securing devices 17, and the supporting frame 15 is rotatable upon a circular bearing 18 of the stationary bed of the machine to impart the necessary generating or rolling motion to the cutter head as will be more fully described presently. From the description thus far, it will be apparent that the cutter head and cutter spindle are mounted eccentrically with reference to the rotary axis of the supporting frame 15 and the position of the cutter head with reference to the axis about which it swings bodily can be varied through the adjustments just referred to, making it possible to move the cutter head either laterally, upwardly, or downwardly in relation to the rotary axis or center of the supporting frame 15. After being thus adjusted, when the machine is in operation, the cutter head is in rotary motion with its tools traveling through the blank in a circular path, and at the same time the bodily swinging movement of the cutter head causes it to traverse the gear blank after the fashion of a crown gear being moved bodily across a mating gear, the cutting tool in action corresponding to a tooth of the imaginary gear.

Figure 3:
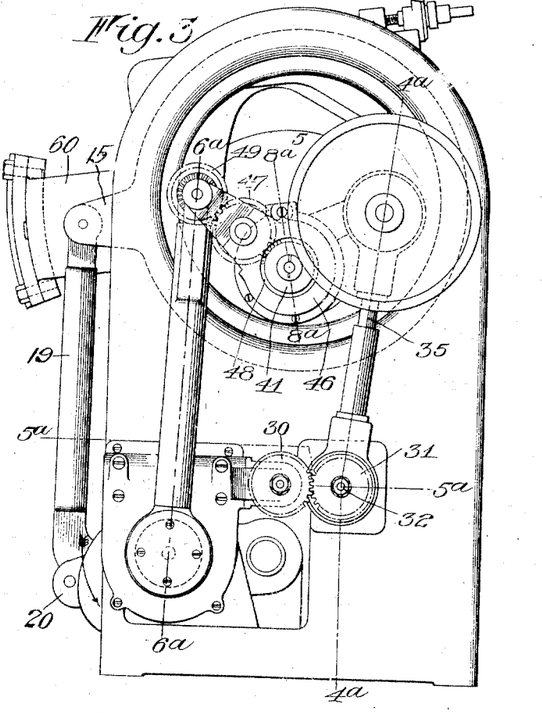
Fig. 3 is an end view of the drive gearing.
Figure 4:
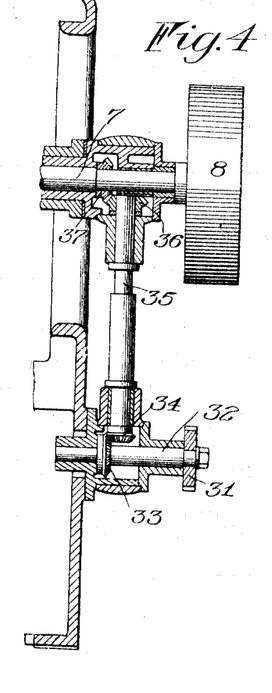
Fig. 4 is a sectional view on line $4^a$—$4^a$ of Fig. 3.
Figure 5:
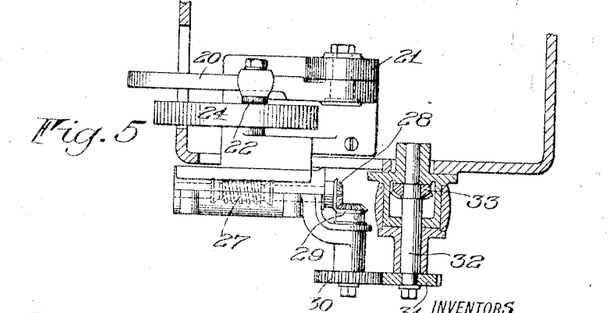
Fig. 5 is a sectional view on line $5^a$—$5^a$ of Fig. 3.
Figures 6, 7:
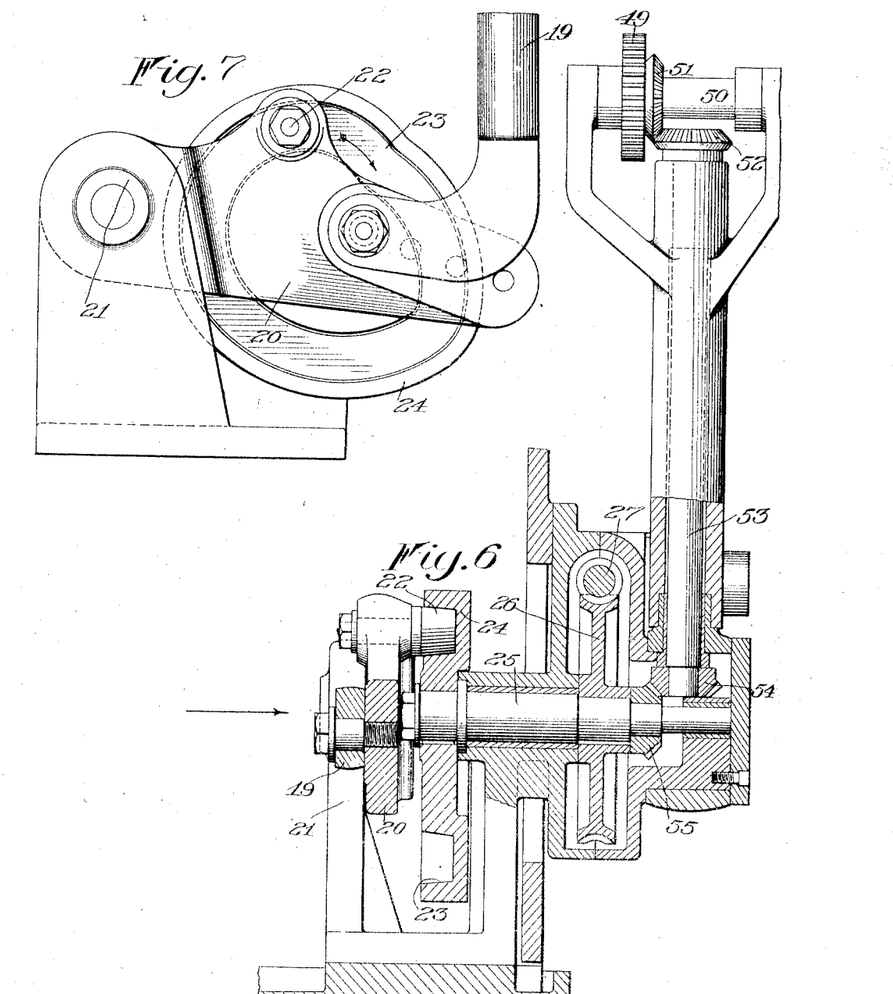
Fig. 6 is a sectional view partially in elevation on line $6^a$—$6^a$ of Fig. 3.
Fig. 7 is a side elevation looking at Fig. 6 in the direction of the arrow.

In order to impart the necessary oscillating motion to the supporting frame 15, and consequent generating motion to the cutter head, the supporting frame has pivoted to it a connecting rod 19, as shown in Fig. 3, and the connecting rod 19 is adjustably attached to a plate 20 which is pivoted upon a stationary standard 21, Fig. 7. The plate 20 carries a pin or projection 22 engaging a cam slot 23 in the cam plate 24. The cam plate 24 is secured upon a shaft 25 as shown in Fig. 6, which also carries a worm wheel 26 driven by worm 27. The worm 27 is mounted upon a shaft which carries a bevel gear 28 driven by a coöperating bevel gear 29 upon a second shaft which has fixed thereto at its outer end a spur gear 30. Spur gear 30 is driven by a coöperating spur gear 31 fixed upon a shaft 32, provided with a bevel gear 33, the latter being driven by a bevel gear 34 at the lower end of a vertical spindle 35 which is operated from the main drive shaft 7 through the bevel pinions 36 and 37 as shown in Figs. 4 and 5. The cam slot 23 is so formed that by its continuous rotation, it moves the connecting rod first in one direction and then in the other, causing the cutter head supporting frame to be oscillated, and thereby feeding the cutter head across the gear blank first in one direction and then in the other and imparting the proper generated shape or profile to the side face of each tooth during the movement in one direction, which curve is usually that of an involute or closely approximate thereto.

Figures 8, 9:
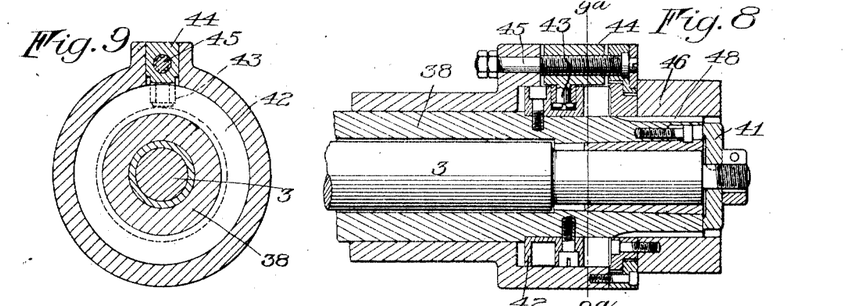
Fig. 8 is a sectional view on the line $8^a$—$8^a$ of Fig. 3.
Fig. 9 is a sectional view on line $9^a$—$9^a$ of Fig. 8.

It is necessary that the cutter head be fed into the blank in order to cut the proper depth, and at the end of the cutting operation, be removed from cutting relation to permit the blank to be indexed, and to accomplish this we employ a mechanism that operates the cutter spindle in a direction longitudinally of its own axis as will now be described. The cutter spindle 3 is arranged within a sleeve 38 which is movable for rotation independently of the cutter spindle but said sleeve and spindle are fixed against relative endwise movement by the coöperating tapered portions 39 and 40 at one end as shown in Fig. 10, and a head 41 carried by the outer end of the spindle and engaging the outer end of the sleeve. A periodic endwise movement is imparted to the sleeve 38 and consequently to the cutter spindle 3 through the instrumentality of two relatively movable cam members, one of which is attached to the sleeve 38, and the other of which is independently mounted and according to a preferred arrangement we attach a cam 42 to the sleeve 38 as shown in Fig. 8. Coöperating with the cam 42 is a cam member in the form of a pin or projection 43 which is stationarily located while the sleeve 38 and its cam member are rotated. The cam projection 43 is preferably carried by a block 44 that is adjustably supported by means of a threaded rod 45 in a bearing 45 which also houses the sleeve 38. The cam projection 43 can thus be adjusted in one direction or the other to allow for wear of the parts and shortening of the cutter blades, in sharpening, while the amount of movement of the sleeve 38 endwise remains the same and is determined by the shape of the cam 42 which is such as to impart to the cutter head a slow feeding-in movement toward the center of the blank for cutting, and a quick withdrawing motion after which the cutter head is held out of engagement from the blank long enough to permit the indexing mechanism to operate as will be described presently. The sleeve 38 is rotated through the instrumentality of a gear 47 as shown in Fig. 3 which coöperates with teeth 48 formed upon the outer end of the sleeve 38 as appears in Figs. 3 and 8. The gear 47 is driven from a coöperating gear wheel 49 (see Figs. 3 and 6) and the latter is fixed on an arbor 50 carrying a bevel pinion 51 driven by a coöperating bevel pinion 52 fixed upon the upper end of a vertical spindle 53. The latter carries at its lower end a bevel pinion 54 driven by a coöperating bevel gear 55 which is fixed upon the aforementioned shaft 25 as shown in Fig. 6.

Figures 2, 16:
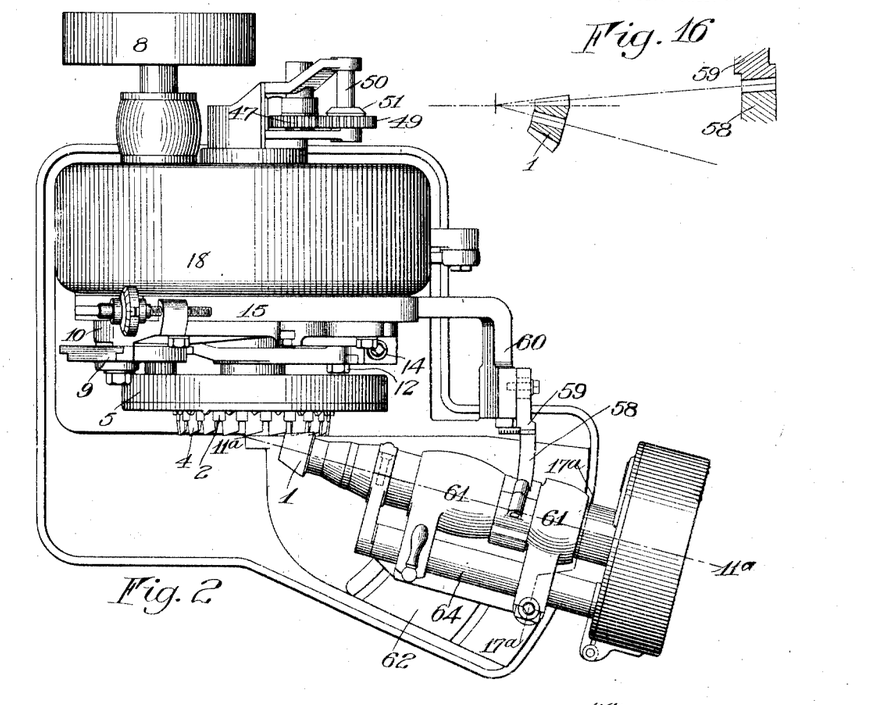
Fig. 2 is a plan view.
Fig. 16 is a diagrammatic view showing the relation of the gear blank to the generating crown gear and segment, when adjusted into cutting relation with the cutter.

The gear blank 1 is suitably fixed upon a blank spindle 56 as usual in this class of machines, and the blank spindle 56 is arranged within a generating sleeve 57 which is normally locked to the blank spindle and turned slowly during the cutting operation to impart the necessary generating motion to the gear blank about its axis. To accomplish this the generating sleeve 57 carries an arm 58 having a generating gear segment at its outer edge which coöperates with a generating crown gear 59, the latter being attached to a projecting arm 60 that is carried by the aforesaid supporting frame 15. Thus during the oscillatory movement of the supporting frame 15, the generating sleeve 57 is correspondingly oscillated and carries with it the blank spindle 56, except when the latter is released to effect the indexing operation. Fig. 16 shows diagrammatically the relative positions of the cutter head, gear blank, and generating crown gear and segment and while this arrangement may be varied in accordance with any preferred gear practice, we so adjust the gear blank and spindle that the cutters will always travel in a plane parallel to the root line or base of the tooth. The blank spindle and generating sleeve are arranged in suitable standards 61 which are adjustable upon a bed 62 and when the parts are set up for commencing an operation, the blank is moved in toward the cutter until it is in such position that the plane of travel of the tools is parallel to a line extending along the base or root of the tooth to be cut. Lengthwise adjustment of the blank spindle is secured through an adjusting pinion 63 which engages teeth upon a spindle 64, the latter being fixedly attached to the sleeve 57 and blank spindle 56 as appears in Figs. 1 and 2.

Figure 11:
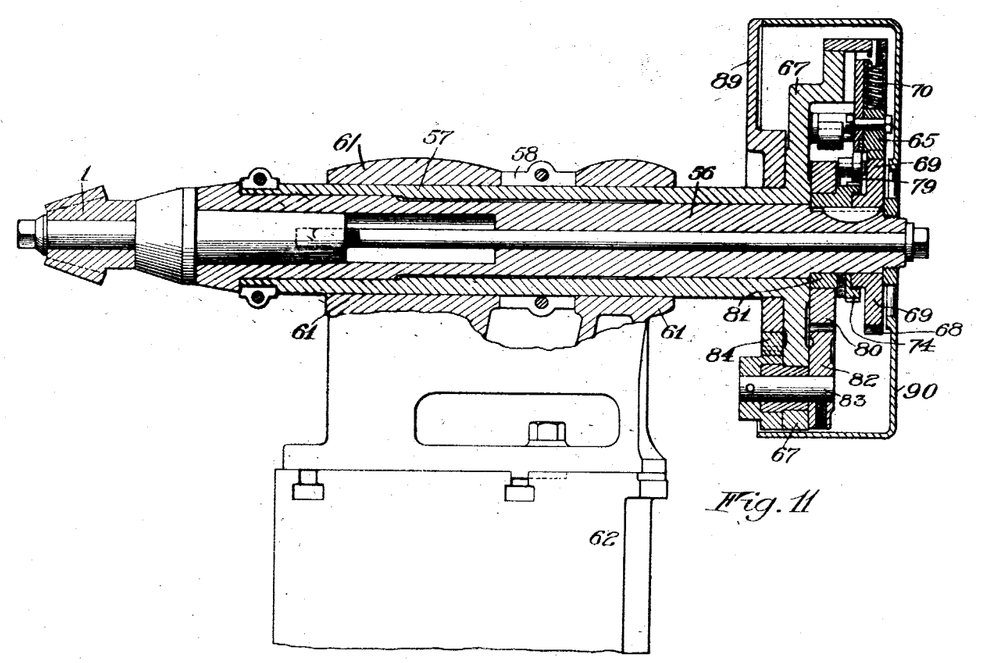
Fig. 11 is a sectional view on the line $11^a$—$11^a$ of Fig. 2.
Figures 12, 14:
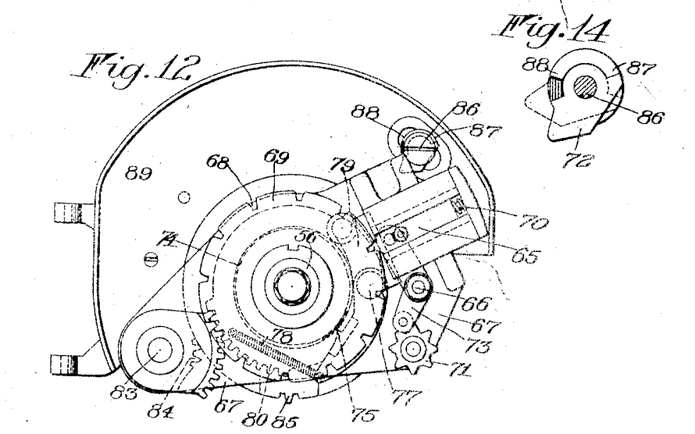
Fig. 12 is an end view of the index mechanism with part of the casing removed, and showing the parts in normal position.
Fig. 14 is a detail view of the controlling stop for the index mechanism.
Figures 13, 15:
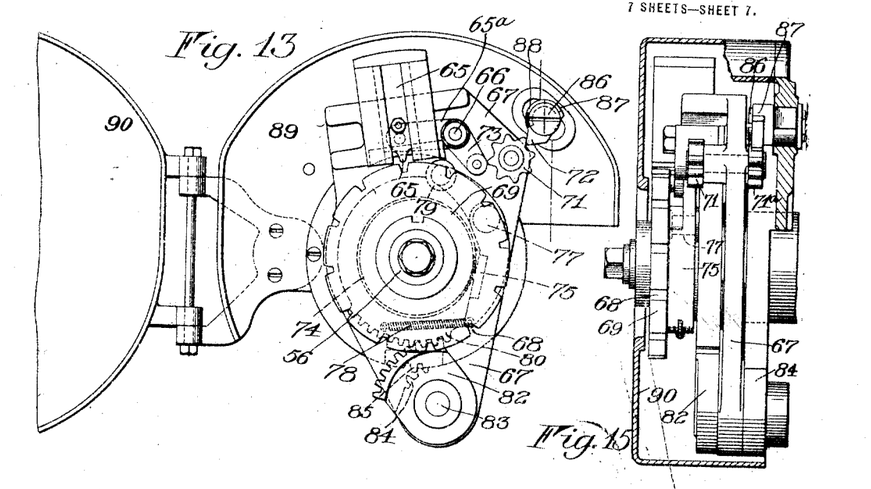
Fig. 13 is a similar view showing the position of the parts of the index mechanism at the moment the blank spindle is about to be turned for indexing.
Fig. 15 is a side elevation of the parts of the index mechanism partially in section.
Figure 17:
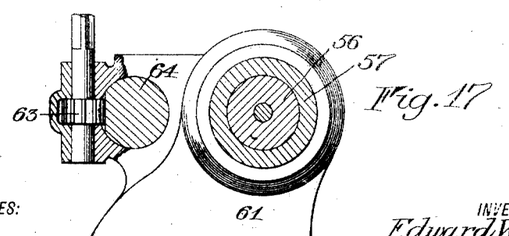
Fig. 17 is a detail sectional view on the line $17^a$—$17^a$ of Fig. 2.

The sleeve 57 is normally locked with relation to the blank spindle 56 as already mentioned, through a locking dog 65 which is slidably connected to an arm 65ª pivoted at 66 upon a carrier plate 67 secured to the sleeve 57, and the locking dog 65 engages one of a series of notches 68 in a locking disk 69 which is keyed to the blank spindle 56. The locking pawl 65 is held in locking engagement by a spring 70 and is lifted out of engagement with the locking disk 69 as the generating sleeve is moved in one direction said movement of the generating sleeve 57 causing a pivoted star wheel 71 to be turned by engagement with a relatively stationary stop in the form of a pawl or projection 72 in the path of movement of said star wheel, which in turn engages the tail piece 73 of the arm 65ª as shown in Fig. 13 to release the pawl 65. When this occurs, the blank spindle is rotated through the space of one tooth in the following manner. Keyed upon the blank spindle is a ratchet wheel 74 with which coöperates an actuating member or ratchet pawl 75, the latter being pivotally mounted at 77 upon the carrier 80. The pawl 75 is actuated by a spring 78 and is normally held out of engagement with the ratchet wheel 74 by the locking pawl 65 which engages a tail piece 79 of the pawl 75 as shown in Fig. 12. The carrier 80 on which the ratchet pawl is mounted comprises a gear wheel which is loosely journaled upon a bearing 81 as shown in Fig. 11, and engaging the gear wheel 80 is a gear segment 82 which is fixed on an arbor 83 rotatably supported upon the carrier plate 67 and movable therewith during oscillation of the generating sleeve 57. Arbor 83 also carries a gear segment 84 arranged for engagement with a stationary tooth 85 on the housing 89 as the dog 65 moves from the position shown in Fig. 12 to that shown in Fig. 13. As the plate 67 is oscillated from the normal or starting position shown in Fig. 12, it swings about the axis of the blank spindle during the generating and cutting action and the gear segment 84 slides over the adjacent portion of the housing 89 until it engages the tooth 85, when the gear segment 82 is rocked upon its axis thereby turning the carrier 80, and with it the ratchet pawl 75 moving the latter backwardly until it engages a tooth in the ratchet wheel 74. After the generating sleeve has rolled to the limit of its movement in one direction the return motion takes place, and the parts are so timed that just as the locking pawl is lifted out of engagement with the locking disk 69, as shown in Fig. 13, the gear segment 84 will engage the tooth 85 and cause a forward rotation of the carrier 80 and of the ratchet pawl 75, which thereby turns the ratchet wheel 74 and with it the blank spindle 56 sufficiently to index for one tooth space. As soon as the generating sleeve 56 has moved far enough to carry the star wheel 71 beyond the pawl 72, the locking pawl 65 is forced back into locking position, at the same time causing disengagement of the ratchet pawl 75 with the ratchet wheel 74, and by this time the blank spindle and locking disk 69 will have been carried around to bring the next notch 68 into locking relation with the locking pawl 65, thus indexing the blank spindle to bring the next tooth into cutting relation. The stop or controlling pawl 72 is pivoted upon a pin 86 and has a limited movement between the shoulders 87 and 88, which is sufficient to permit the indexing parts to move in one direction, or anti-clockwise, without effecting any operation, the pawl 72 merely turning about its axis to the position shown in dotted lines in Fig. 14, but upon the return movement of the indexing mechanism, the pawl is in the position shown in full lines in Figs. 13 and 14, being held by the shoulder 87 and then engages the star wheel 71 to effect the operation already described. The index mechanism is arranged within a housing 89 which is provided with a hinged door or closure 90.

We claim as our invention:

1. In a gear cutting machine, the combination with a cutter spindle, of a sleeve in which the cutter spindle is freely rotatable and held against relative endwise movement, a cam and coöperating cam member, one of which parts is carried by said sleeve, and means for driving one of said cam parts to effect endwise reciprocating movement of the sleeve and cutter spindle.

2. In a gear cutting machine, the combination with a cutter spindle, of a sleeve in which the cutter spindle is freely rotatable and held against relative endwise movement, a cam fixed on the sleeve, a cam member coöperating therewith and means for rotating one of said cam parts, acting to effect endwise reciprocating feeding movement of the sleeve and cutter spindle.

3. In a gear cutting machine, the combination with a cutter spindle and an internal gear fixed thereto, of a pinion engaging said gear for driving the cutter spindle, a sleeve in which the cutter spindle is freely rotatable and held against relative endwise movement, a cam and coöperating cam member, and means for rotating one of said cam parts to effect endwise reciprocatory feeding movement of the sleeve and the cutter spindle.

4. In a gear cutting machine, the combination with a cutter spindle and an internal gear fixed thereto, a pinion engaging said gear for driving the cutter spindle, a sleeve in which the cutter spindle is freely rotatable and held against relative endwise movement, a cam carried by the sleeve, a coöperating cam member which is relatively fixed, and means for rotating the sleeve to effect endwise reciprocating feeding movement of the sleeve and the cutter spindle.

5. In a gear generating machine, the combination with a circular bearing, of a supporting frame journaled in said bearing, means for imparting an oscillatory movement to the frame in said bearing, and a cutter head arranged eccentrically of the supporting frame and movable independently thereof.

6. In a gear generating machine, the combination with a circular bearing, of a supporting frame journaled in said bearing, means for imparting an oscillatory movement to the frame in said bearing, and a rotary face milling cutter mounted eccentrically of the supporting frame and movable independently thereof.

7. In a gear generating machine, the combination with a circular bearing, of a supporting frame journaled in said bearing, means for imparting an oscillatory movement to the frame in said bearing, a rotary face milling cutter mounted eccentrically of the supporting frame and movable independently thereof, and adjusting means for varying the position of the cutter head on the frame.

8. In a gear cutting machine, the combination of a support having a bearing therein, a frame journaled in said bearing, a revoluble cutter head eccentrically mounted in said frame, pivotally supported means connected to said frame and means for imparting a predetermined oscillatory movement to said pivotally supported means.

9. In a gear cutting machine, the combination of a support having a bearing therein, a frame journaled in said bearing, a revoluble cutter head eccentrically mounted in said frame, a pivoted plate operatively connected to said frame, and means for imparting a predetermined pivotal movement to said plate for oscillating said frame.

10. In a gear cutting machine, the combination of a support having a bearing therein, a frame journaled in said bearing, a revoluble cutter head eccentrically mounted in said frame, a pivoted plate, a rod connected to said frame and adjustably connected to said plate, and a cam adapted to impart an oscillatory movement to said pivoted plate.

11. In a gear cutting machine, the combination of a support having a bearing therein, a frame journaled in said bearing, a revoluble cutter head eccentrically mounted in said frame, means for imparting a predetermined oscillatory movement to said frame, and means for simultaneously moving said cutter head axially in said frame.

12. In a gear cutting machine, the combination of a support, a revoluble cutter head, a shaft adjustable relatively to said cutter head and adapted to support a gear blank, means for feeding said cutter head transversely and longitudinally of its axis to the gear blank, and means for automatically positioning said gear blank for successive teeth.

13. In a gear cutting machine, the combination of an oscillating frame, a cutter head revolubly mounted therein, a shaft adapted to support a gear blank in operative relation to said cutter head, means for axially reciprocating the cutter head in said frame and means operatively connected to said oscillating frame for moving said shaft to effect indexing.

14. In a gear cutting machine, the combination of a rotatably mounted frame, means for oscillating said frame, a cutter head revolubly mounted in said frame eccentrically thereof, a shaft adapted to support a gear blank in operative relation to said cutter head, means for axially reciprocating the cutter head in said frame, and a gear on said oscillating frame adapted to move said shaft to effect indexing.

15. In a gear cutting machine, the combination of a rotatably mounted frame, means for oscillating said frame, a cutter head revolubly mounted in said frame eccentrically thereof, a shaft adapted to support a gear blank in operative relation to said cutter head, means for axially reciprocating the cutter head in said frame, a sleeve in which said shaft is mounted, and means for transmitting motion from said frame to said sleeve.

16. In a gear cutting machine, the combination of a rotatably mounted frame, means for oscillating said frame, a cutter head revolubly mounted in said frame eccentrically thereof, a shaft adapted to support a gear blank in operative relation to said cutter head, means for axially reciprocating the cutter head in said frame, a generating sleeve in which said shaft is mounted, means on said frame for rotating said sleeve, and means controlled by said sleeve for rotating said shaft to effect indexing.

17. In a gear cutting machine, the combination of a rotatably mounted frame, means for oscillating said frame, a cutter head revolubly mounted in said frame, a shaft adapted to support a gear blank in operative relation to said cutter head, means controlled by said frame for rotating said shaft to effect indexing, and means for withdrawing said head during the indexing operation.

18. In a gear cutting machine, the combination of a support having a bearing therein, a frame journaled in said bearing, a cutter head mounted in said frame for rotation about an axis eccentric to the axis of said support bearing, a rotary blank spindle, said cutter head and spindle being relatively adjustable to accommodate blanks of different size, driving means for rotating said cutter head, means for feeding the latter toward and withdrawing the same from a blank carried by said spindle, generating means effecting relative rolling action between said cutter head and spindle, and indexing means for shifting the spindle during the withdrawal of the cutter head.

EDWARD W. BULLOCK.
GEORGE H. BRYAN.